(12) United States Patent
Sagayama

(10) Patent No.: US 11,339,890 B2
(45) Date of Patent: May 24, 2022

(54) BRAKE HYDRAULIC PRESSURE CONTROLLER, MOTORCYCLE BRAKE SYSTEM, AND MANUFACTURING METHOD OF BRAKE HYDRAULIC PRESSURE CONTROLLER

(71) Applicant: Robert Bosch GmbH, Stuttgart (DE)

(72) Inventor: Kosaku Sagayama, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 16/466,061

(22) PCT Filed: Oct. 25, 2017

(86) PCT No.: PCT/IB2017/056620
§ 371 (c)(1),
(2) Date: Jun. 3, 2019

(87) PCT Pub. No.: WO2018/100449
PCT Pub. Date: Jun. 7, 2018

(65) Prior Publication Data
US 2020/0063881 A1  Feb. 27, 2020

(30) Foreign Application Priority Data

Dec. 2, 2016  (JP) .............................. JP2016-234625

(51) Int. Cl.
*F16K 27/04* (2006.01)
*B60T 7/04* (2006.01)
(Continued)

(52) U.S. Cl.
CPC ............ *F16K 27/048* (2013.01); *B60T 7/042* (2013.01); *B60T 7/085* (2013.01); *B60T 8/261* (2013.01); *B60T 8/3685* (2013.01)

(58) Field of Classification Search
CPC .... B60T 13/686; B60T 8/3605; B60T 8/4086; B60T 13/167; B60T 8/4031; F16K 31/003; F16K 27/003; Y10S 303/10
See application file for complete search history.

(56) References Cited

U.S. PATENT DOCUMENTS 3,198,874 A * 8/1965 Dahl ................... F16L 23/024
174/561
3,476,165 A * 11/1969 Vaughn ................ F16B 37/043
411/103
(Continued)

FOREIGN PATENT DOCUMENTS

GB        2486050        6/2012
JP       2003516262 A    5/2003
(Continued)

OTHER PUBLICATIONS

International Search Report for Application No. PCT/IB2017/056620 dated Feb. 19, 2018 (English Translation, 3 pages).

*Primary Examiner* — Robert A. Siconolfi
*Assistant Examiner* — Mahbubur Rashid
(74) *Attorney, Agent, or Firm* — Michael Best & Friedrich LLP

(57) ABSTRACT

The invention has a purpose of obtaining a brake hydraulic pressure controller capable of attaching a coil casing to a base body with a simple configuration, a motorcycle brake system, and a manufacturing method of a brake hydraulic pressure controller.
In the brake hydraulic pressure controller, at least one projected portion is provided in the coil casing, at least one hole portion is provided in a surface of the base body to which the coil casing is attached, the coil casing is attached to the base body in a state where the projected portion is inserted in the hole portion, the projected portion includes a hook portion that bulges in a direction to cross a projected (Continued)

direction of said projected portion, the coil casing is held by the base body when a part of the base body abuts a surface of a base-side region that is a region near a base of the projected portion with a top of a bulge of the hook portion being a reference.

12 Claims, 5 Drawing Sheets

(51) Int. Cl.
  *B60T 7/08* (2006.01)
  *B60T 8/26* (2006.01)
  *B60T 8/36* (2006.01)

(56) References Cited

U.S. PATENT DOCUMENTS

| | | | | |
|---|---|---|---|---|
| 3,593,747 A * | 7/1971 | Mercier | F16L 55/052 | 138/30 |
| 4,555,838 A * | 12/1985 | Muller | F16B 37/065 | 29/432.1 |
| 4,586,843 A * | 5/1986 | Heng | H02B 1/048 | 403/252 |
| 4,946,351 A * | 8/1990 | Richardson, Jr. | F01C 21/007 | 248/27.3 |
| 5,333,647 A * | 8/1994 | Fukano | F15B 13/0817 | 137/271 |
| 5,984,263 A * | 11/1999 | Hosoya | F16K 31/0665 | 251/129.15 |
| 6,203,117 B1 * | 3/2001 | Starr | B60T 8/368 | 138/31 |
| 6,269,834 B1 * | 8/2001 | Huhnen | F15B 13/0817 | 137/269 |
| 6,287,090 B1 * | 9/2001 | Hamasaki | F01C 21/10 | 417/360 |
| 6,360,778 B1 * | 3/2002 | Vennemeyer | B60T 8/368 | 138/31 |
| 6,795,317 B1 * | 9/2004 | Liu | H01L 23/4093 | 165/80.3 |
| 6,874,756 B2 * | 4/2005 | Hawkins | F15B 13/0817 | 137/553 |
| 7,427,114 B2 * | 9/2008 | Ohishi | B60T 8/368 | 303/119.2 |
| 8,141,959 B2 * | 3/2012 | Ota | F15B 13/0835 | 303/3 |
| 8,740,173 B2 * | 6/2014 | Hagihara | F16K 27/0236 | 248/680 |
| 2002/0171287 A1 | 11/2002 | Ohishi et al. | | |
| 2004/0113488 A1 * | 6/2004 | Sekihara | B60T 8/368 | 303/119.3 |
| 2008/0258544 A1 * | 10/2008 | Iyatani | F15B 13/0814 | 303/10 |
| 2010/0264723 A1 * | 10/2010 | Atsushi | B60T 8/3685 | 303/10 |
| 2013/0033098 A1 * | 2/2013 | Nagashima | H05K 9/0015 | 303/199 |
| 2014/0030127 A1 * | 1/2014 | Fellmeth | F04B 53/1087 | 417/559 |

FOREIGN PATENT DOCUMENTS

| | | | |
|---|---|---|---|
| JP | 2003341497 A * | 12/2003 | |
| JP | 2006161913 | 6/2006 | |
| JP | 2008074404 A | 4/2008 | |
| JP | 2011051359 | 3/2011 | |
| JP | 2013071491 | 4/2013 | |
| WO | 0139571 | 6/2001 | |
| WO | WO-2007115543 A2 * | 10/2007 | F16B 11/00 |

* cited by examiner

X-X

BRAKE HYDRAULIC PRESSURE CONTROLLER, MOTORCYCLE BRAKE SYSTEM, AND MANUFACTURING METHOD OF BRAKE HYDRAULIC PRESSURE CONTROLLER

BACKGROUND OF THE INVENTION

The invention relates to a brake hydraulic pressure controller, a motorcycle brake system that includes the brake hydraulic pressure controller, and a manufacturing method of a brake hydraulic pressure controller for manufacturing the brake hydraulic pressure controller.

Conventionally, a brake system for a vehicle such as a motorcycle (a two-wheeled motor vehicle or a three-wheeled motor vehicle) can generate a braking force on a wheel when an occupant of the vehicle operates a brake lever, and a pressure of a brake fluid in a brake fluid circuit is increased. It has also been known to adopt an antilock brake system (ABS) unit, for example, as a brake hydraulic pressure controller that regulates the braking force.

This brake hydraulic pressure controller can regulate the braking force to be generated on the wheel by increasing or decreasing the pressure of the brake fluid in the brake fluid circuit.

As the brake hydraulic pressure controller, a controller in which a pump device that changes the pressure of the brake fluid in the brake fluid circuit, a hydraulic pressure regulation valve used to increase or decrease the pressure of the brake fluid, a control unit that controls the pump device and the hydraulic pressure regulation valve, and the like are unitized has been available (for example, see JP-A-2011-51359).

SUMMARY OF THE INVENTION

The conventional brake hydraulic pressure controller is configured that a coil casing is held by a base body by using a fastening member such as a screw, the coil casing accommodating a drive coil that drives the hydraulic pressure regulation valve, and the base body being formed with a channel that is filled with the brake fluid therein. However, such a structure requires a process of attaching the fastening member and also requires a space for a tool used for the attachment of the fastening member.

The invention has been made with a problem as described above as the background and therefore has a purpose of obtaining a brake hydraulic pressure controller capable of attaching a coil casing to a base body with a simple configuration, a motorcycle brake system, and a manufacturing method of a brake hydraulic pressure controller.

A brake hydraulic pressure controller according to the invention includes: a base body formed with a channel that is filled with a brake fluid therein; a hydraulic pressure regulation valve opening/closing the channel; a drive coil driving the hydraulic pressure regulation valve; and a coil casing accommodating the drive coil. At least one projected portion is provided in the coil casing, and at least one hole portion is provided in a surface of the base body to which the coil casing is attached. The coil casing is attached to the base body in a state where the projected portion is inserted in the hole portion. The projected portion includes a hook portion that bulges in a direction to cross a projected direction of said projected portion. The coil casing is held by the base body when a part of the base body abuts a surface of a base-side region that is a region near a base of the projected portion with a top of a bulge of the hook portion being a reference.

A motorcycle brake system according to the invention includes the above-described brake hydraulic pressure controller.

A manufacturing method of a brake hydraulic pressure controller according to the invention is a manufacturing method of a brake hydraulic pressure controller that includes: a base body formed with a channel that is filled with a brake fluid therein; a hydraulic pressure regulation valve opening/closing the channel; a drive coil driving the hydraulic pressure regulation valve; and a coil casing accommodating the drive coil, at least one projected portion being provided in the coil casing, at least one hole portion being provided in a surface of the base body to which the coil casing is attached, and the projected portion including a hook portion that bulges in a direction to cross a projected direction of said projected portion. The manufacturing method of the brake hydraulic pressure controller includes: a process of attaching the coil casing to the base body in a state where the projected portion is inserted in the hole portion; and a process of applying a pressure to the base body and abutting a part of the base body against a surface of a base-side region that is a region near a base of the projected portion with a top of a bulge of the hook portion being a reference.

According to the brake hydraulic pressure controller according to the invention, the coil casing can be held by the base body by using the projected portion and the hole portion. Therefore, necessity of a fastening member such as a screw is reduced, manufacturability of the brake hydraulic pressure controller can be improved, and downsizing of the brake hydraulic pressure controller can be realized.

According to the motorcycle brake system according to the invention, with the above-described brake hydraulic pressure controller, a strong demand for downsizing of equipment mounted thereon can be handled.

According to the manufacturing method of the brake hydraulic pressure controller according to the invention, the coil casing can be held by the base body by using the projected portion and the hole portion. Therefore, the necessity of the fastening member such as the screw is reduced, and the manufacturability of the brake hydraulic pressure controller is improved.

DETAILED DESCRIPTION

Figure 1:
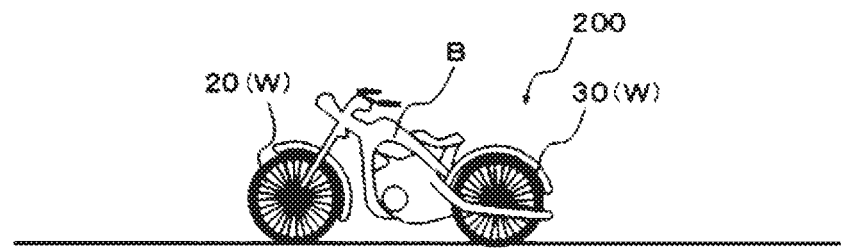
FIG. 1 is a schematic view of one example of a configuration of a motorcycle on which a motorcycle brake system according to an embodiment is mounted.

A description will hereinafter be made on an embodiment of the invention with appropriate reference to the drawings.

Note that a description will hereinafter be made on a case where a brake hydraulic pressure controller according to the invention is used for a motorcycle; however, the brake hydraulic pressure controller according to the invention may be used for a vehicle other than the motorcycle (for example, an automobile, a truck, or the like). In addition, a description will hereinafter be made on a case where the brake hydraulic pressure controller according to the invention is applied to a brake system that includes a front-wheel hydraulic circuit and a rear-wheel hydraulic circuit; however, the brake hydraulic pressure controller according to the invention may be applied to a brake system that only includes one of the front-wheel hydraulic circuit and the rear-wheel hydraulic circuit.

A configuration, an operation, and the like, which will be described below, constitute merely one example, and the brake hydraulic pressure controller according to the invention is not limited to a case with such a configuration, such an operation, and the like. For example, the brake hydraulic pressure controller according to the invention may perform an operation other than that as an ABS.

There is a case where a dimensional relationship of components in each of the drawings differs from the actual dimensional relationship. In the drawings, members or portions that are the same or in a corresponding relationship will be denoted by the same reference sign or will not be denoted by the reference sign. In addition, in each of the drawings, detailed portions will appropriately be simplified or will not be depicted.

<Exterior Configuration of Motorcycle 200>

A description will be made on a configuration of a motorcycle 200 by using FIG. 1. Note that, in the following description, a motorcycle brake system according to the embodiment will be referred to as a brake system 100.

FIG. 1 is a schematic view of one example of the configuration of the motorcycle on which the motorcycle brake system according to the embodiment is mounted.

In the motorcycle 200, wheels W, a body B, and the brake system 100 are combined. The body B includes all components of the motorcycle 200 other than the brake system 100 and the wheels W. Note that, in this embodiment, such a description that the motorcycle 200 is a two-wheeled motor vehicle will be made; however, the motorcycle 200 is not limited thereto and may be a three-wheeled motor vehicle.

<Overall Configuration of Brake System 100>

A description will be made on an overall configuration of the brake system 100 by using FIG. 2.

Figure 2:
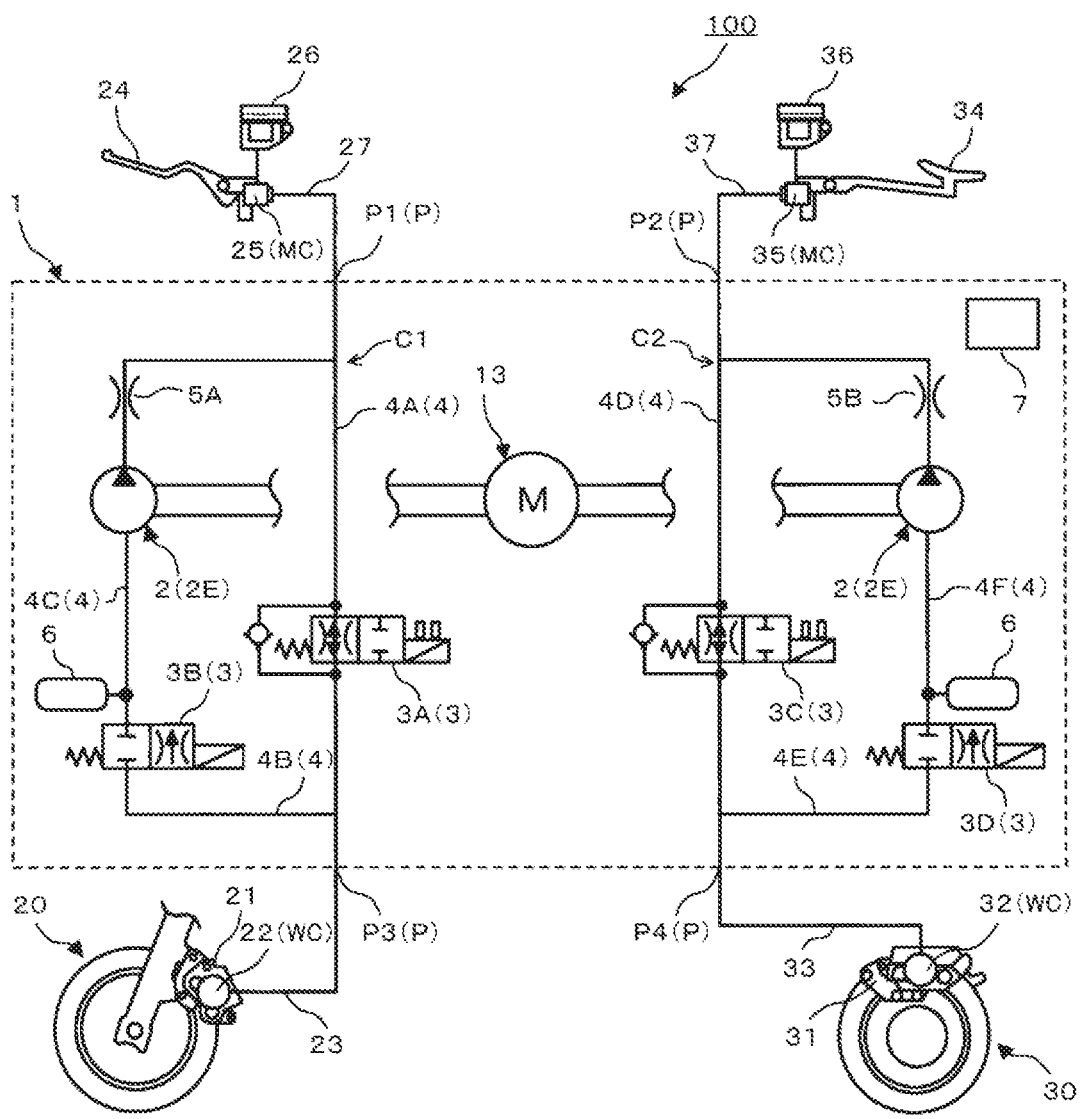
FIG. 2 is a schematic configuration diagram of the motorcycle brake system that includes a brake hydraulic pressure controller according to the embodiment.

FIG. 2 is a schematic configuration diagram of the motorcycle brake system that includes a brake hydraulic pressure controller according to the embodiment.

The brake system 100 includes a brake hydraulic pressure controller 1 that changes a braking force to be generated on each of the wheels W of the motorcycle 200.

The brake system 100 also includes a handlebar lever 24 and a foot pedal 34 that are operated by a user who drives the two-wheeled motor vehicle, or the like. When this handlebar lever 24 is operated, the braking force is generated on a front wheel 20. When the foot pedal 34 is operated, the braking force is generated on a rear wheel 30.

The brake system 100 includes: a front-wheel hydraulic circuit C1 through which a brake fluid used to generate the braking force on the front wheel 20 flows; and a rear-wheel hydraulic circuit C2 through which the brake fluid used to generate the braking force on the rear wheel 30 flows.

The brake system 100 includes the following configuration as a mechanism that generates the braking force on the front wheel 20, and the like. More specifically, the brake system 100 includes: a front brake pad 21 that is provided in a manner to correspond to the front wheel 20; a front wheel cylinder 22 in which a front brake piston (not depicted) actuating the front brake pad 21 is provided in a freely slidable manner; and a brake fluid pipe 23 that is connected to the front wheel cylinder 22.

Note that the front brake pad 21 is provided in a manner to hold a rotor (not depicted) that rotates with the front wheel 20 therebetween. When being pressed by the front brake piston in the front wheel cylinder 22, the front brake pad 21 abuts the rotor and generates a friction force. In this way, the braking force is generated on the front wheel 20 that rotates with the rotor.

The brake system 100 includes: a first master cylinder 25 that is attached to the handlebar lever 24; a first reservoir 26 that stores the brake fluid; and a brake fluid pipe 27 that is connected to the first master cylinder 25. Note that a master cylinder piston (not depicted) is provided in the freely slidable manner in the first master cylinder 25. When the handlebar lever 24 is operated, the master cylinder piston in the first master cylinder 25 moves. Because a pressure of the brake fluid that is applied to the front brake piston is changed by a position of the master cylinder piston, a force of holding the rotor by the front brake pad 21 is changed. As a result, the braking force on the front wheel 20 is changed.

The brake system 100 includes the following configuration as a mechanism that generates the braking force on the rear wheel 30, and the like. More specifically, the brake system 100 includes: a rear brake pad 31 that is provided in a manner to correspond to the rear wheel 30; a rear wheel cylinder 32 in which a rear brake piston (not depicted) moving the rear brake pad 31 is provided in the freely slidable manner; and a brake fluid pipe 33 that is connected to the rear wheel cylinder 32.

Note that the rear brake pad 31 is provided in a manner to hold a rotor (not depicted) that rotates with the rear wheel 30 therebetween. When being pressed by the rear brake piston in the rear wheel cylinder 32, the rear brake pad 31 abuts the rotor and generates the friction force. In this way, the braking force is generated on the rear wheel 30 that rotates with the rotor.

The brake system 100 includes: a second master cylinder 35 that is attached to the foot pedal 34; a second reservoir 36 that stores the brake fluid; and a brake fluid pipe 37 that is connected to the second master cylinder 35. Note that a master cylinder piston (not depicted) is provided in the freely slidable manner in the second master cylinder 35. When the foot pedal 34 is operated, the master cylinder piston in the second master cylinder 35 moves. Because the pressure of the brake fluid that is applied to the rear brake piston is changed by a position of the master cylinder piston, a force of holding the rotor by the rear brake pad 31 is changed. As a result, the braking force on the rear wheel 30 is changed.

<Configuration of Brake Hydraulic Pressure Controller 1>

A description will be made on a configuration of the brake hydraulic pressure controller 1 by using FIG. 2 to FIG. 5.

Figure 3:
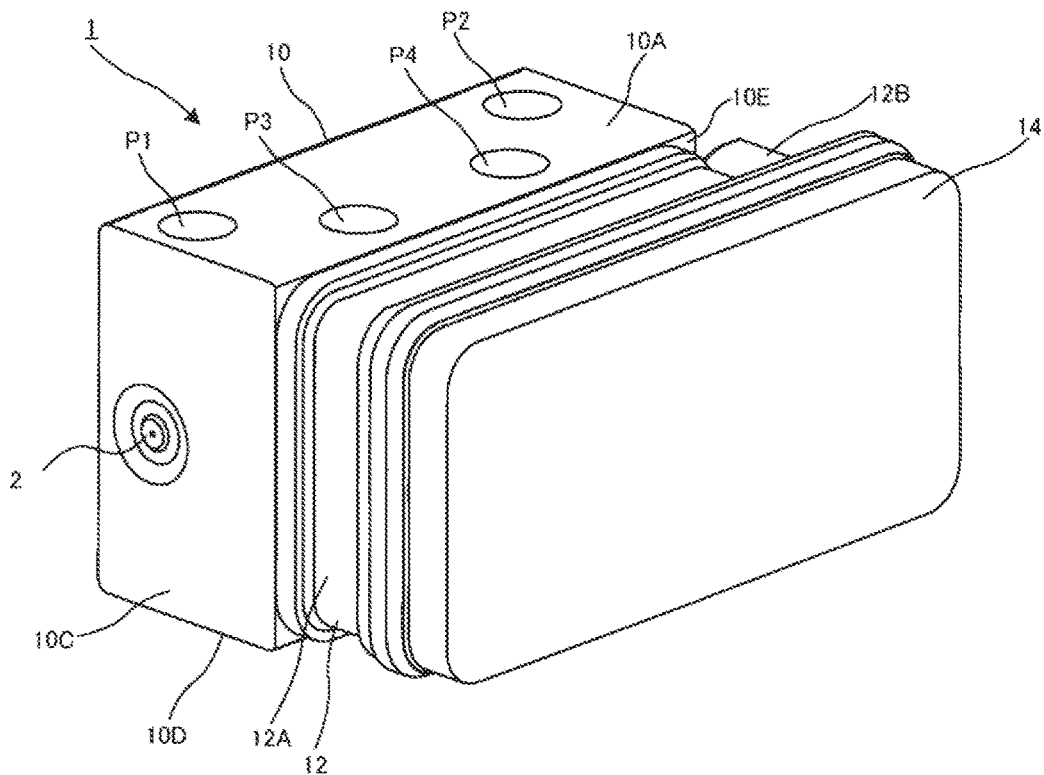
FIG. 3 is a perspective view of the brake hydraulic pressure controller according to the embodiment.

FIG. 3 is a perspective view of the brake hydraulic pressure controller according to the embodiment.

Figure 4:
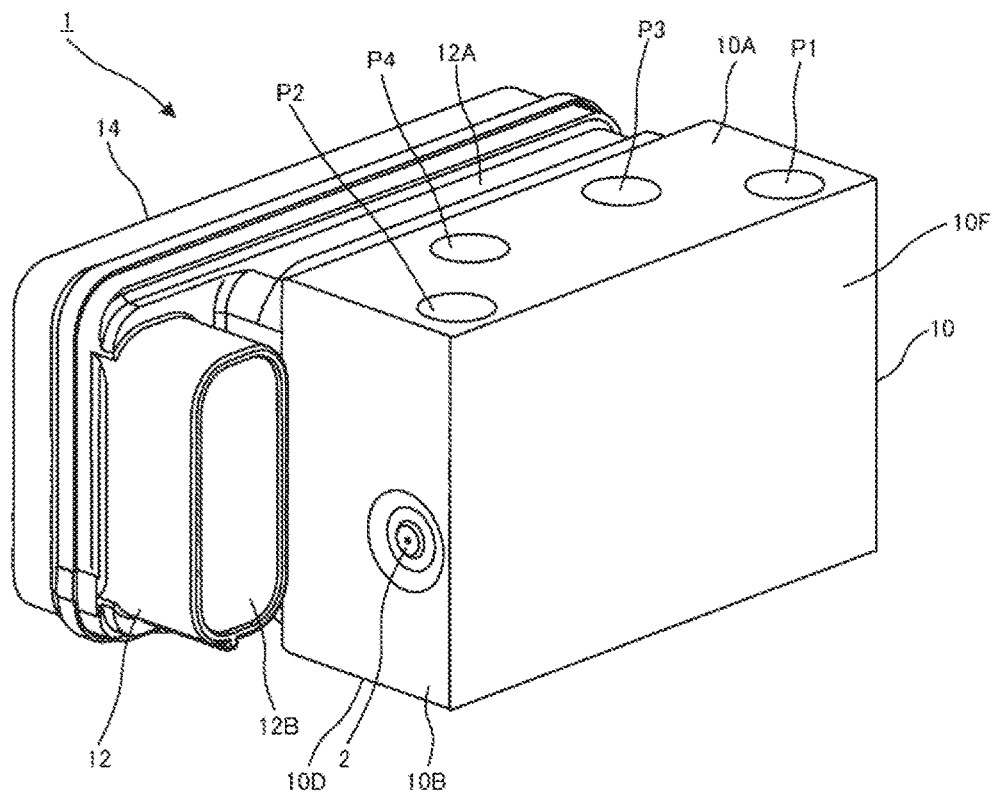
FIG. 4 is a perspective view of the brake hydraulic pressure controller according to the embodiment that is seen at a different angle from FIG. 3.

FIG. 4 is a perspective view of the brake hydraulic pressure controller according to the embodiment that is seen at a different angle from FIG. 3.

Figure 5:
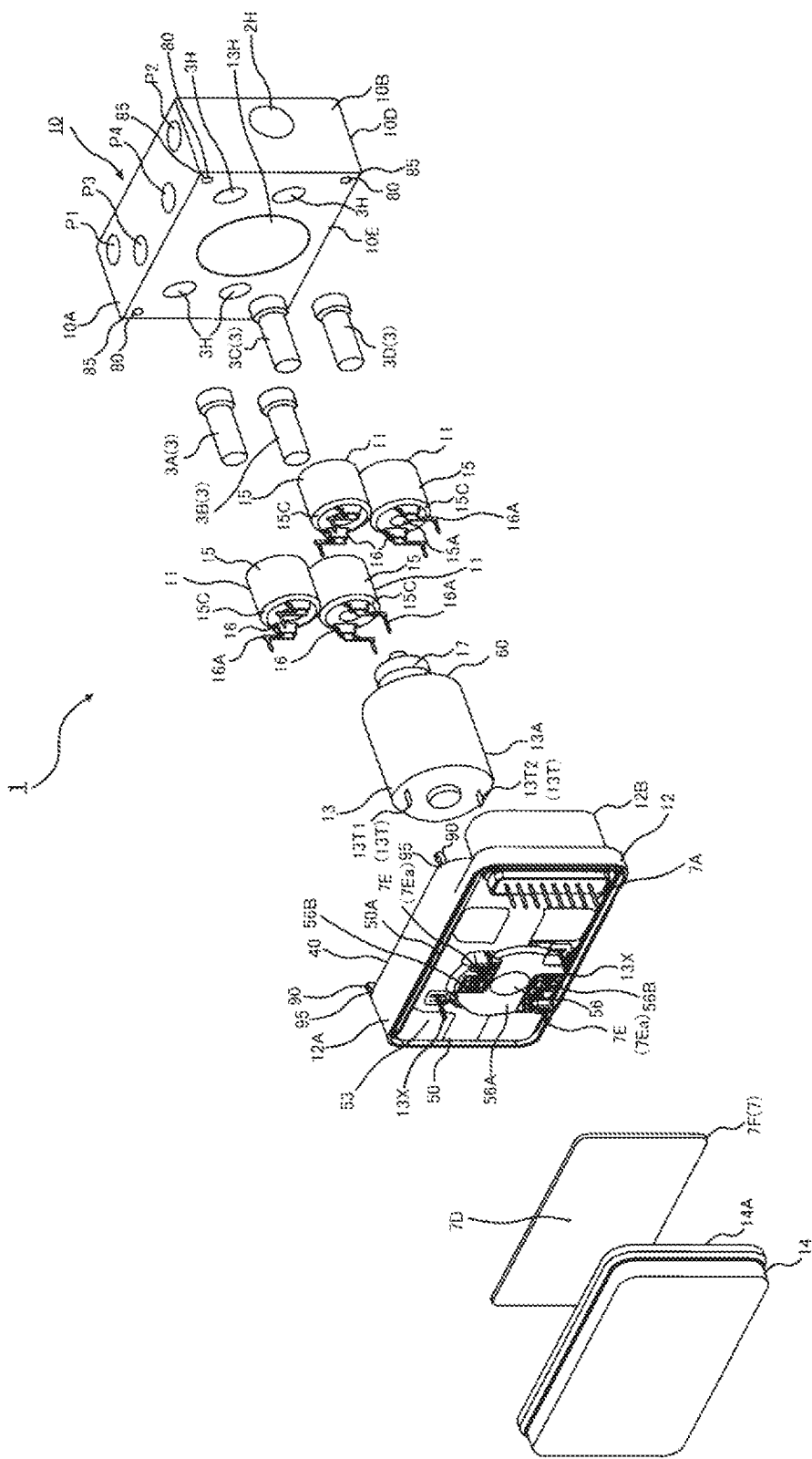
FIG. 5 is an exploded perspective view of the brake hydraulic pressure controller according to the embodiment.

FIG. 5 is an exploded perspective view of the brake hydraulic pressure controller according to the embodiment.

The brake hydraulic pressure controller 1 is configured by including: a base body 10 that is formed with an internal channel 4 (see FIG. 2) through which the brake fluid flows; a pump device 2 that is assembled to the base body 10; hydraulic pressure regulation valves 3 that are freely openable/closable and are provided in the front-wheel hydraulic circuit C1 and the rear-wheel hydraulic circuit C2; drive coils 11 that respectively drive the hydraulic pressure regulation valves 3; a coil casing 12 that accommodates the drive coils 11; a motor 13 as a drive source of the pump device 2; a control unit 7 that includes a control section controlling operations of the pump device 2 and the hydraulic pressure regulation valves 3; a controller casing 14 that accommodates a circuit board 7F of the control unit 7; and the like.

As depicted in FIG. 3 and FIG. 4, exterior appearance of the brake hydraulic pressure controller 1 is configured that the base body 10, the coil casing 12, and the controller casing 14 are combined.

Next, a description will be made on a configuration of each component of the brake hydraulic pressure controller 1 with reference to FIG. 2 to FIG. 5.

(Base Body 10)

The base body 10 is made of metal such as aluminum and is formed of a substantially rectangular parallelepiped block. The base body 10 has a first surface 10A, a second surface 10B, a third surface 10C, a fourth surface 10D, a fifth surface 10E, and a sixth surface 10F.

The first surface 10A is a surface that is located on an upper side of the sheet in FIG. 3 and FIG. 4. The second surface 10B is a surface that is located on a left side of the sheet in FIG. 4. The third surface 10C is a surface that is located on the left side of the sheet in FIG. 3. The fourth surface 10D is a surface that is located on a lower side of the sheet in FIG. 3 and FIG. 4. The fifth surface 10E is a surface to which the coil casing 12 is attached in FIG. 3. The sixth surface 10F is a surface that is located on a right side of the sheet in FIG. 4.

In other words, the first surface 10A opposes the fourth surface 10D, the second surface 10B opposes the third surface 10C, and the fifth surface 10E opposes the sixth surface 10F.

The internal channel 4, through which the brake fluid flows, is formed in the base body 10.

The internal channel 4 is configured by including: a first internal channel 4A, a second internal channel 4B, and a third internal channel 4C, each of which constitutes a part of the front-wheel hydraulic circuit C1; and a fourth internal channel 4D, a fifth internal channel 4E, and a sixth internal channel 4F, each of which constitutes a part of the rear-wheel hydraulic circuit C2.

Various ports P are opened in the first surface 10A of the base body 10. The various ports P are configured by including: a first port P1 that corresponds to a drive mechanism including the handlebar lever 24 and the like; a second port P2 that corresponds to a drive mechanism including the foot pedal 34 and the like; a third port P3 that corresponds to a drive mechanism including the front brake pad 21 and the like; and a fourth port P4 that corresponds to a drive mechanism including the rear brake pad 31 and the like. The brake fluid pipe 27 is connected to the first port P1. The brake fluid pipe 37 is connected to the second port P2. The brake fluid pipe 23 is connected to the third port P3. The brake fluid pipe 33 is connected to the fourth port P4.

Of the internal channel 4, the first internal channel 4A is connected to an outflow side of the brake fluid in the pump device 2, a first booster valve 3A as one of the hydraulic pressure regulation valves 3, and the first port P1. In addition, the first internal channel 4A is provided with a first flow restrictor 5A that regulates a flow rate of the brake fluid flowing through the internal channel 4.

Of the internal channel 4, the second internal channel 4B is connected to the first booster valve 3A, a first reduction valve 3B as one of the hydraulic pressure regulation valves 3, and the third port P3.

Of the internal channel 4, the third internal channel 4C is connected to an inflow side of the brake fluid into the pump device 2 and the first reduction valve 3B. In addition, the third internal channel 4C is provided with an accumulator 6 that stores the brake fluid in the internal channel 4.

Of the internal channel 4, the fourth internal channel 4D is connected to the outflow side of the brake fluid in the pump device 2, a second booster valve 3C as one of the hydraulic pressure regulation valves 3, and the second port P2. In addition, the fourth internal channel 4D is provided with a second flow restrictor 5B that regulates the flow rate of the brake fluid flowing through the internal channel 4.

Of the internal channel 4, the fifth internal channel 4E is connected to the second booster valve 3C, a second reduction valve 3D as one of the hydraulic pressure regulation valves 3, and the fourth port P4.

Of the internal channel 4, the sixth internal channel 4F is connected to the inflow side of the brake fluid into the pump device 2 and the second reduction valve 3D. In addition, the sixth internal channel 4F is provided with the accumulator 6 that stores the brake fluid in the internal channel 4.

A hole portion 80 is formed at four corners of the fifth surface 10E as the surface of the base body 10 to which the coil casing 12 is attached. Projected portions 90 of the coil casing 12, which will be described below, are respectively inserted in the hole portions 80. In a state where the base body 10 is seen in an orthogonal direction to the fifth surface 10E, an outer periphery of the base body 10 includes angulated corner portions 85, and the hole portions 80 are respectively provided in these angulated corner portions 85.

Note that a case where all of the hole portions 80 are provided in the corner portions 85 is exemplified herein; however, at least one of the hole portions 80 may not be provided in the corner portion 85.

(Pump Device 2)

The pump device 2 includes two pump elements 2E that receive drive power from the motor 13 such as a DC motor. One of the pump elements 2E is used to deliver the brake fluid in the front-wheel hydraulic circuit C1 and delivers the brake fluid in the third internal channel 4C to the first internal channel 4A side. The other pump element 2E is used to deliver the brake fluid in the rear-wheel hydraulic circuit C2 and delivers the brake fluid in the sixth internal channel 4F to the fourth internal channel 4D side. Each of the pump element 2E reciprocates by rotary movement of an eccentric surface of an eccentric mechanism 17 that is driven by the motor 13. The pump elements 2E are respectively accommodated in pump openings 2H that are formed in the base body 10.

(Motor 13)

The motor 13 includes a motor section 13A that includes a casing, a stator, a rotor, and the like. The motor 13 is provided on the coil casing 12 side of the base body 10. An operation of the motor section 13A is controlled by the control unit 7. Two motor terminals 13T in thin piece shapes are vertically provided at an end of the motor section 13A on the coil casing 12 side. One of the motor terminals 13T is a positive terminal 13T1, and the other of the motor terminals 13T is a negative terminal 13T2.

(Eccentric Mechanism 17)

The eccentric mechanism 17 drives the pump device 2 by using rotary power that is transmitted from the motor 13. That is, the eccentric mechanism 17 transmits the rotary power, which is transmitted from the motor section 13A of the motor 13, to the pump device 2.

(Deceleration Mechanism 60)

A deceleration mechanism 60 is provided between the motor 13 and the eccentric mechanism 17, decelerates rotation generated in the motor section 13A of the motor 13, that is, amplifies torque, and transmits the amplified torque to the eccentric mechanism 17. The deceleration mechanism 60 is attached to a rotary shaft of the motor 13 and is accommodated with a part of the motor 13 in a motor opening 13H that is formed in the base body 10.

(Hydraulic Pressure Regulation Valves 3 and Drive Coils 11)

Each of the hydraulic pressure regulation valves 3 is a valve that is provided to open/close the internal channel 4 of the base body 10. The operation of each of the hydraulic pressure regulation valves 3 is controlled by the control unit 7. The hydraulic pressure regulation valves 3 include the first booster valve 3A, the first reduction valve 3B, the second booster valve 3C, and the second reduction valve 3D. Each of the hydraulic pressure regulation valves 3 can be constructed of an electromagnetic valve that has the drive coil 11, for example, and an opened/closed state thereof is switched when energization thereof is controlled by the control unit 7.

In each of the drive coils 11, a winding is accommodated in a cylindrical coil housing 15. One end side of each of the hydraulic pressure regulation valves 3 is accommodated in a columnar opening portion 15A that penetrates the coil housing 15. The other end side of each of the hydraulic pressure regulation valves 3 is accommodated in a regulation valve opening 3H that is formed in the fifth surface 10E of the base body 10. When the energization of the drive coil 11 is turned on/off in this state, a movable element of the hydraulic pressure regulation valve 3 that is accommodated in the base body 10 moves, and a valve body that interlocks with the movable element moves between a closed position and an open position.

One end of each of the coil housings 15 is fixed to the fifth surface 10E of the base body 10. A pair of terminal boards 16 is vertically provided at the other end 15C that opposes the one end of the coil housing 15. A coil terminal 16A is provided in a tip portion of each of the terminal boards 16, and power is supplied to the drive coil 11 via the coil terminal 16A.

(Accumulator 6)

The accumulator 6 is arranged in an accumulator opening (not depicted) that is formed in the base body 10.

(Control Unit 7)

The control unit 7 includes the circuit board 7F that is provided with: an input section receiving signals from detection mechanisms; a processor section performing arithmetic processing; a memory section storing a program; and the like. The coil terminals 16A of the drive coils 11 and the motor terminals 13T of the motor 13 are connected to the circuit board 7F. More specifically, the circuit board 7F is formed with plural opening portions 7D, through each of which one end 7Ea of a metal piece 7E connected to the motor terminal 13T is inserted. In addition, the circuit board 7F is formed with plural opening portions (not depicted), through which the coil terminals 16A and pins 13X are respectively inserted.

Note that the control unit 7 includes various types of the detection mechanisms, each of which outputs the detection signal to the circuit board 7F. As the detection mechanisms, for example, an acceleration sensor used to acquire a gradient value of a road surface, a front-wheel speed sensor used to compute a wheel speed of the front wheel 20, a rear-wheel speed sensor used to compute a wheel speed of the rear wheel 30, and the like are provided.

In a state where the one ends 7Ea of the metal pieces 7E are respectively inserted through the opening portions 7D, the circuit board 7F is brought into a parallel state with a first surface portion 50 of the coil casing 12. In this state, the circuit board 7F is accommodated in the controller casing 14. That is, when the one ends 7Ea of the metal pieces 7E are respectively inserted through the opening portions 7D, the circuit board 7F of the control unit 7 is positioned and is attached in parallel with the first surface portion 50.

(Coil Casing 12)

The coil casing 12 is configured by including: a frame portion 12A; and an accommodating portion 12B that is formed on a side of the frame portion 12A and accommodates a connector 7A connected to the control unit 7.

The frame portion 12A is formed with coil holes 53 and a motor hole 56. When the drive coils 11 are respectively accommodated in the coil holes 53, the coil terminals 16A are projected from the first surface portion 50 of the coil casing 12, and the circuit board 7F can thereby be connected. When the motor 13 is accommodated in the motor hole 56, the motor terminals 13T respectively penetrate terminal openings 56B that are formed in a bottom portion 56A of the motor hole 56, are projected from the first surface portion 50 of the coil casing 12, and can thereby be connected to the other ends of the metal pieces 7E, the one ends 7Ea of which are connected to the circuit board 7F, respectively.

The projected portions 90 are formed at edges of four corners of a second surface portion 40 that is a surface of the frame portion 12A opposing the fifth surface 10E of the base body 10. The projected portions 90 are respectively inserted in the hole portions 80 of the base body 10. In a state where the coil casing 12, which is attached to the base body 10, is seen in an orthogonal direction to the fifth surface 10E of the base body 10, an outer periphery of the coil casing 12 includes rounded corner portions 95, and the projected portions 90 are respectively provided in these rounded corner portions 95.

Note that a case where all of the projected portions 90 are provided in the corner portions 95 is exemplified herein; however, at least one of the projected portions 90 may not be provided in the corner portion 95.

The first surface portion 50 includes an edge 50A that abuts an opening edge 14A of the controller casing 14 at a time when the controller casing 14 is attached to the coil casing 12.

The second surface portion 40 is adhered to the fifth surface 10E of the base body 10 via an adhesive member, for example. This adhesive member is preferably a seal member having waterproof performance.

(Controller Casing 14)

The controller casing 14 functions as a lid member that is attached to the first surface portion 50 of the coil casing 12 and accommodates the circuit board 7F of the control unit 7 therein.

<Attachment Structure of Coil Casing 12 to Base Body 10>

A description will be made on an attachment structure of the coil casing 12 to the base body 10 by using FIG. 6 to FIG. 8.

Figure 6:
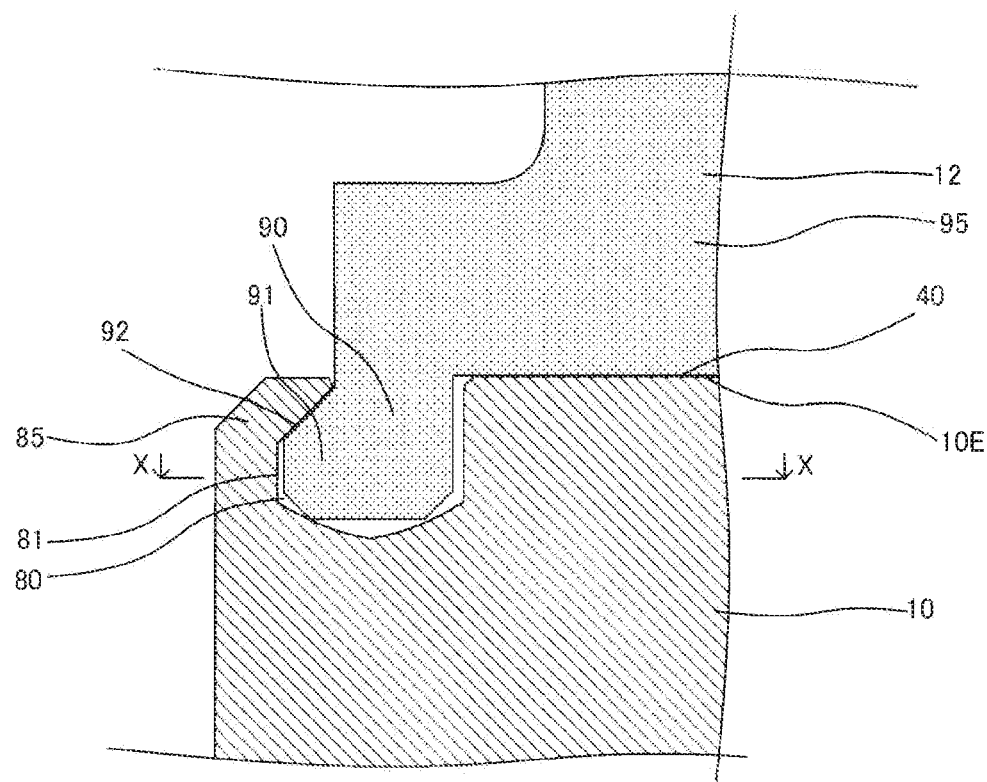
FIG. 6 is a vertical cross-sectional view that schematically depicts a state where a coil casing of the brake hydraulic pressure controller according to the embodiment is held by a base body.

FIG. 6 is a vertical cross-sectional view that schematically depicts a state where the coil casing of the brake hydraulic pressure controller according to the embodiment is held by the base body.

Figure 7:
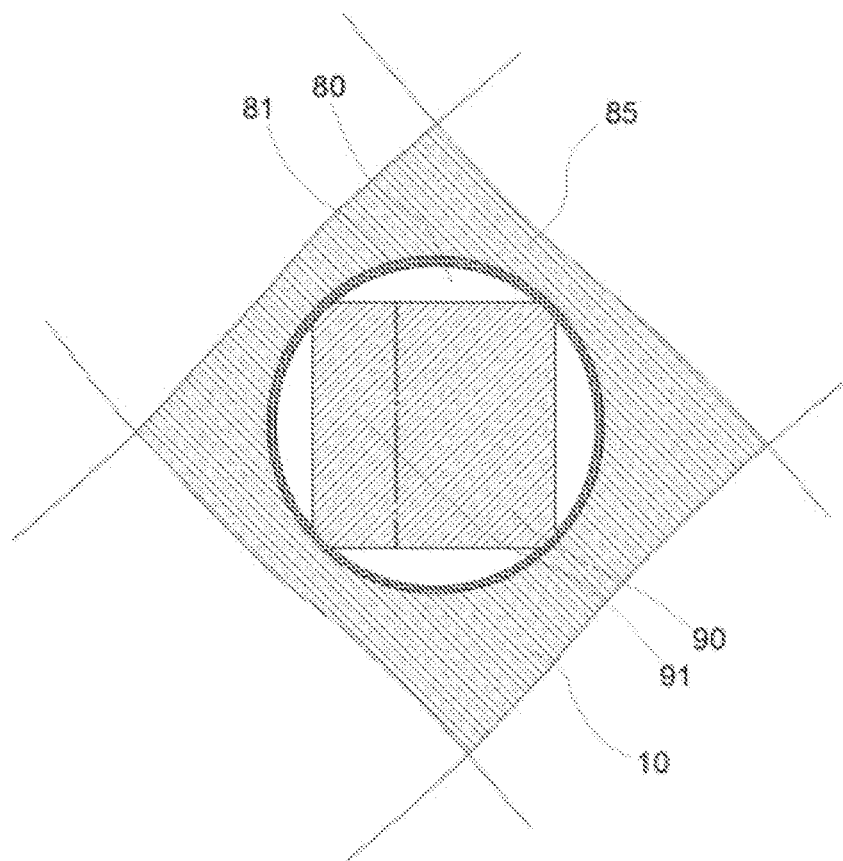
FIG. 7 is a cross-sectional view taken along X-X in FIG. 6.

FIG. 7 is a cross-sectional view taken along X-X in FIG. 6. Note that, in FIG. 7, the cross-sectional view taken along X-X in FIG. 6 is rotated 45° counterclockwise.

Figure 8:
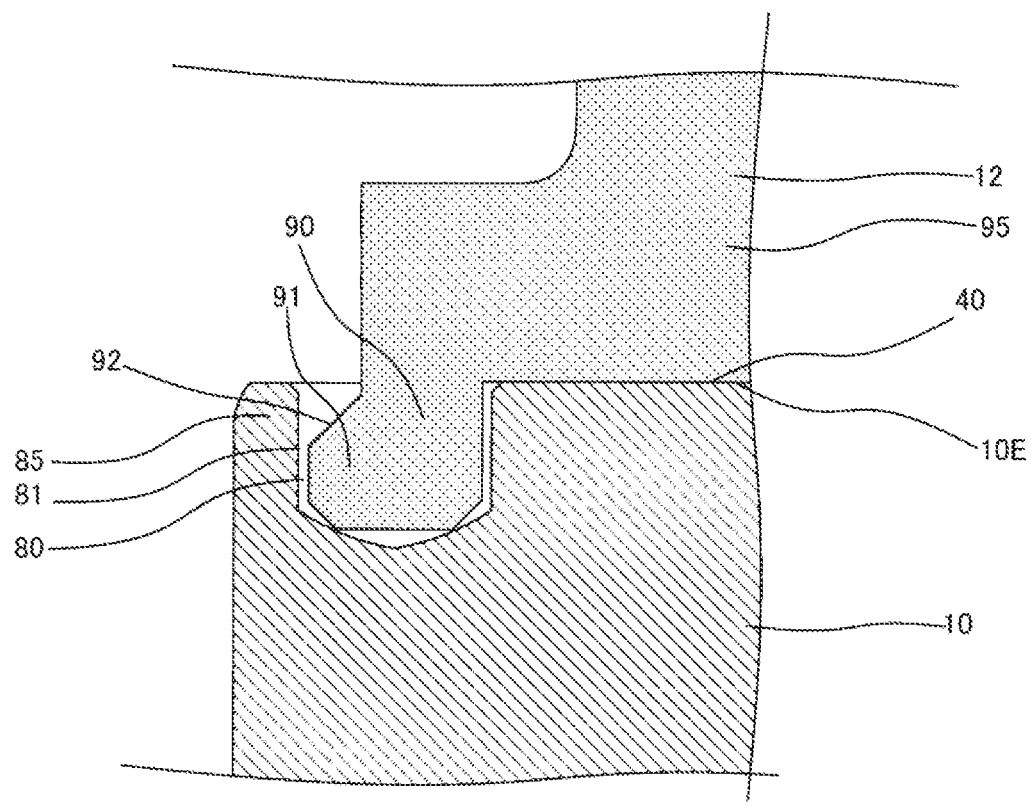
FIG. 8 is a vertical cross-sectional view that schematically depicts a state where a projected portion of the coil casing of the brake hydraulic pressure controller according to the embodiment is inserted in a hole portion of the base body.

FIG. 8 is a vertical cross-sectional view that schematically depicts a state where the projected portion of the coil casing of the brake hydraulic pressure controller according to the embodiment is inserted in the hole portion of the base body.

A description will first be made on a state where the coil casing 12 is attached to the base body 10 by using FIG. 6 and FIG. 7.

As described above, the projected portion 90 is provided at the edge of the second surface portion 40 of the coil casing 12. As depicted in FIG. 7, the projected portion 90 is configured to have a rectangular shape in a top view, for example. The projected portion 90 includes a hook portion 91 that bulges in a direction to cross a projected direction of the projected portion 90 (a downward direction of the sheet in FIG. 6). In a state of being seen in the orthogonal direction to the fifth surface 10E of the base body 10, the hook portion 91 is projected to an outer side of the edge of the second surface portion 40 in the coil casing 12.

With a top of a bulge of the hook portion 91 (an left end of the sheet in FIG. 6) being a reference, the projected portion 90 has: a base as a portion connected to the edge of the second surface portion 40 of the coil casing 12; and a tip portion as an end on a side that is inserted in the hole portion 80 of the base body 10. In addition, the hook portion 91 has a surface of a base-side region (hereinafter referred to as a base-side region surface 92) that is a region near the base of the projected portion 90.

As depicted in FIG. 6, the projected portion 90 is inserted in the hole portion 80 of the base body 10, and the hook portion 91 is locked to the base body 10. In this way, the coil casing 12 is attached to the base body 10. More specifically, the projected portion 90 is inserted in the hole portion 80 of the base body 10, and the hook portion 91 is caulked to the base body 10 such that a part of the base body 10 abuts the base-side region surface 92 of the hook portion 91. In this way, the coil casing 12 is held by the base body 10.

The base-side region surface 92 is inclined with respect to the projected direction of the projected portion 90. More specifically, the base-side region surface 92 is inclined toward the outer side of the coil casing 12, that is, inclined downward to the left side of the sheet in FIG. 6 as being separated from the edge of the second surface portion 40. For example, in the case where the base-side region surface 92 is not inclined, that is, is in parallel with the fifth surface 10E of the base body 10, the base body 10 has to be significantly deformed at a time when the projected portion 90 is caulked by the part of the base body 10. Meanwhile, in the case where the base-side region surface 92 is inclined, the projected portion 90 can be caulked by the part of the base body 10 with a small deformation amount of the base body 10. Accordingly, detachment of the projected portion 90 from the hole portion 80 and lateral dislocation of the projected portion 90 from the hole portion 80 can be inhibited. Note that an inclination angle of the base-side region surface 92 is not particularly limited.

When the projected portion 90 is inserted in the hole portion 80, as depicted in FIG. 7, at least a part of a back side of the hook portion 91 in a lateral portion of the projected portion 90 (an upper corner and a right corner in FIG. 7) abuts an inner surface 81 of the hole portion 80. That is, the projected portion 90 is press-fitted to the hole portion 80 when the projected portion 90 is inserted in the hole portion 80. In this way, a positioning property of the coil casing 12 with respect to the base body 10 is improved. In addition, application of a load on the projected portion 90 during deformation of the base body 10 is inhibited. Thus, caulking strength can be improved. Note that the projected portion 90 in the rectangular shape in the top view has been exemplified herein; however, at least the part of the back side of the hook portion 91 in the lateral portion of the projected portion 90 only needs to have a shape that can abut the inner surface of the hole portion 80, and the projected portion 90 may have a triangular shape in the top view or a polygonal shape with five or more angles in the top view.

Next, a description will be made on a manufacturing method of the brake hydraulic pressure controller 1, in particular, an attachment method of the coil casing to the base body by using FIG. 6 and FIG. 8.

First, the coil casing 12 formed with the projected portions 90 and the base body 10 formed with the hole portions 80 are prepared. Then, as depicted in FIG. 8, in the state where the projected portions 90 of the coil casing 12 are respectively inserted in the hole portions 80 of the base body 10, the second surface portion 40 of the coil casing 12 is adhered to the fifth surface 10E of the base body 10. Thereafter, a pressure is applied inward from the outer side of the base body 10, so as to deform the part of the base body 10. More specifically, the pressure is applied to an outer peripheral surface side of each of the hole portions 80 of the base body 10, and the part of the base body 10 is deformed to change the shapes of the hole portions 80. By deforming the part of the base body 10, the part of the base body 10 abuts the base-side region surface 92 of each of the projected portions 90, which are respectively inserted in the hole portions 80. In this way, the projected portions 90 are respectively locked to the hole portions 80, and the coil casing 12 is thereby held by the base body 10. In addition, locking of the projected portions 90 to the hole portions 80 also functions to temporarily press the coil casing 12 against the base body 10 during the adhesion. Then, the circuit board 7F is connected, the controller casing 14 is attached, and the brake hydraulic pressure controller 1 is then completed.

<Effects>

According to the brake hydraulic pressure controller 1 according to the embodiment, the part of the base body 10 abuts the base-side region surface 92 of each of the projected portions 90, which are respectively inserted in the hole portions 80, and the coil casing 12 is thereby held by the base body 10. Thus, when the coil casing 12 is held by the base body 10, necessity of a fastening member such as a screw is reduced. Therefore, manufacturability of the brake hydraulic pressure controller 1 is improved, and downsizing of the brake hydraulic pressure controller 1 can be realized.

According to the brake hydraulic pressure controller 1 according to the embodiment, the base-side region surface 92 is inclined with respect to the projected direction of the projected portions 90. Thus, the projected portions 90 can respectively be caulked to the hole portions 80 with the small deformation amount of the base body 10. Therefore, the detachment and lateral dislocation of the projected portions 90 from the hole portions 80 can be inhibited with the small deformation amount of the base body 10.

According to the brake hydraulic pressure controller 1 according to the embodiment, at least the part of the back side of the hook portion 91 in the lateral portion of each of the projected portions 90 can abut the inner surface of the hole portion 80. Therefore, while the positioning property of the coil casing 12 with respect to the base body 10 is improved, the caulking strength can be improved.

According to the brake hydraulic pressure controller 1 according to the embodiment, the projected portions 90 are provided at the edge of the second surface portion 40 of the coil casing 12, and each of the hook portions 91 is projected to the outer side of the edge of the second surface portion 40 in the state of being seen in the orthogonal direction to the fifth surface 10E of the base body 10. Therefore, complexity of a die that is used to mold the coil casing 12 can be inhibited.

According to the brake hydraulic pressure controller 1 according to the embodiment, the projected portions 90 are respectively provided in the rounded corner portions 95, and the hole portions 80 are respectively provided in the angulated corner portions 85. In this way, a space formed by a difference in the shapes of the rounded corner portion 95 and the angulated corner portion 85 can efficiently be used. Therefore, the base body 10 does not have to be enlarged more than necessary, and the brake hydraulic pressure controller 1 can further be downsized.

According to the brake hydraulic pressure controller 1 according to the embodiment, when the coil casing 12 is adhered to the base body 10, locking of the projected portions 90 to the hole portions 80 also functions to temporarily press the coil casing 12 against the base body 10 during the adhesion. Therefore, the adhesion thereof is reliably performed.

The brake hydraulic pressure controller 1 according to the embodiment is mounted on the brake system 100 of the motorcycle 200. With the brake hydraulic pressure controller 1, a strong demand for downsizing of equipment mounted on the brake system 100 can be handled.

According to the brake hydraulic pressure controller 1 according to the embodiment, the process of attaching the coil casing 12 to the base body 10 in the state where the projected portions 90 are respectively inserted in the hole portions 80 and the process of applying the pressure to the base body 10 and abutting the part of the base body 10 against the base-side region surface 92 of each of the projected portions 90 are provided. Accordingly, the coil casing 12 can be attached to the base body 10 by using the projected portions 90 and the hole portions 80. Therefore, the necessity of the fastening member such as the screw is reduced, and the manufacturability of the brake hydraulic pressure controller 1 is improved.

REFERENCE SIGNS LIST

1: Brake hydraulic pressure controller
2: Pump device
3: Hydraulic pressure regulation valve
4: Internal channel
7: Control unit
10: Base body
11: Drive coil
12: Coil casing
12A: Frame
12B: Accommodating portion
13: Motor
14: Controller casing
15: Coil housing
17: Eccentric mechanism
20: Front wheel
21: Front brake pad
22: Front wheel cylinder
23: Brake fluid pipe
24: Handlebar lever
25: First master cylinder
26: First reservoir
27: Brake fluid pipe
30: Rear wheel
31: Rear brake pad
32: Rear wheel cylinder
33: Brake fluid pipe
34: Foot pedal
35: Second master cylinder
36: Second reservoir
37: Brake fluid pipe
40: Second surface portion
50: First surface portion
60: Deceleration mechanism
80: Hole portion
81: Inner surface
85: Corner portion
90: Projected portion
91: Hook portion
92: Surface of base-side region
95: Corner portion
100: Brake system
200: Motorcycle
C1: Front-wheel hydraulic circuit
C2: Rear-wheel hydraulic circuit

What is claimed is:

1. A brake hydraulic pressure controller comprising:
a base body (10) formed with a channel that is filled with a brake fluid therein;
a hydraulic pressure regulation valve (3) opening/closing the channel;
a drive coil (11) driving the hydraulic pressure regulation valve (3); and
a coil casing (12) accommodating the drive coil (11),
wherein a projected portion (90) is provided in the coil casing (12) and extends from a surface portion of the coil casing (12) in a first direction, and a hole portion (80) is provided in a surface (10E) of the base body (10) to which the coil casing (12) is attached, the hole portion (80) being a blind hole,
wherein the projected portion (90) includes a back side extending along a length of the projected portion,
wherein the projected portion (90) includes a hook portion (91) positioned opposite from the back side and extending in a direction orthogonal to the first direction,
wherein the coil casing (12) is attached to the base body (10) in a state where the projected portion (90) is inserted in the hole portion (80) in the first direction such that the projected portion (90), including the hook portion (91), is positioned entirely within the hole portion (80), and a surface portion (40) of the coil casing (12) is held against the face (10E) of the base body (10),
wherein, to hold the coil casing (12) against the base body (10), a deformed portion of the base body (10) abuts a surface (92) of the hook portion (91), and wherein a part of the back side of the projected portion (90) abuts an inner surface (81) of the hole portion (80), the part of the back side of the projected portion (90) extending further into the hole portion (80) than the surface (92) extends into the hole portion (80).

2. The brake hydraulic pressure controller according to claim 1, wherein
the surface (92) is inclined with respect to the first direction.

3. The brake hydraulic pressure controller according to claim 1, wherein
the hook portion (91) is projected to an outer side edge orthogonal to the surface (10E) of the base body (10).

4. The brake hydraulic pressure controller according to claim 1, wherein
in the state of being seen in the orthogonal direction to the surface (10E) of the base body (10), an outer periphery of the coil casing (12) has a rounded corner portion (95), and an outer periphery of the base body (10) has an angulated corner portion (85),
the projected portion (90) is provided in the rounded corner portion (95), and
the hole portion (80) is provided in the angulated corner portion (85).

5. A motorcycle brake system comprising:
the brake hydraulic pressure controller (1) according to claim 1.

6. The brake hydraulic pressure controller according to claim 1, wherein the projected portion (90) is provided at an edge of the surface portion (40).

7. The brake hydraulic pressure controller according to claim 1, wherein the projected portion (90) is a first projected portion, wherein the hole portion (80) is a first hole portion, and wherein three additional projected portions are configured to hold the coil casing (12) to the base body (10) via three additional hole portions in the same manner that the first projected portion holds the coil casing (12) to the base body (10) via the first hole portion.

8. The brake hydraulic pressure controller according to claim 7, wherein the four projected portions (90) are provided at different corners of the surface portion (40), the surface portion (40) being generally rectangular.

9. The brake hydraulic pressure controller according to claim 7, wherein the four hole portions (80) are provided at different corners of the coil casing (12), the coil casing (12) being generally rectangular.

10. A manufacturing method of a brake hydraulic pressure controller (1), the brake hydraulic pressure controller (1) including:
a base body (10) formed with a channel that is filled with a brake fluid therein;
a hydraulic pressure regulation valve (3) opening/closing the channel;
a drive coil (11) driving the hydraulic pressure regulation valve (3); and
a coil casing (12) accommodating the drive coil (11),
at least one projected portion (90) being provided in the coil casing (12),
at least one hole portion (80) being provided in a surface (10E) of the base body (10) to which the coil casing (12) is attached,
the projected portion (90) being provided at an edge of a surface portion (40) of the coil casing (12), the surface portion (40) opposing the surface (10E) of the base body (10), and
the projected portion (90) including a hook portion (91) that bulges in a direction to cross a projected direction of said projected portion (90),
the manufacturing method of the brake hydraulic pressure controller (1) comprising:
a process of, in an inside region of the base body (10) in relation to the projected portion (90), adhering the surface portion (40) of the coil casing (12) to the surface (10E) of the base body (10) in a state where at least a part of a back side of the hook portion (91) in a lateral portion of the projected portion (90) abuts an inner surface (81) of the hole portion (80); and
a process of, in an outside region of the base body (10) in relation to the projected portion (90), applying a pressure to the base body (10) to deform a part of the base body (10) so that the part of the base body (10) abuts against a surface (92) of a base-side region that is a region near a base of the projected portion (90) with a top of a bulge of the hook portion (91) being a reference in a state where the surface portion (40) is adhered to the surface (10E) of the base body (10) in the inside region of the base body (10) in relation to the projected portion (90).

11. The manufacturing method of a brake hydraulic pressure controller (1) of claim 10, wherein the hook portion (91) is projected to an outer side of the edge in a state of being seen in an orthogonal direction to the surface (10E) of the base body.

12. The brake hydraulic pressure controller according to claim 11, wherein
in the state of being seen in the orthogonal direction to the surface (10E) of the base body (10), an outer periphery of the coil casing (12) has a rounded corner portion (95), and an outer periphery of the base body (10) has an angulated corner portion (85),
the projected portion (90) is provided in the rounded corner portion (95), and
the hole portion (80) is provided in the angulated corner portion (85).

* * * * *